United States Patent [19]

Malone

[11] Patent Number: 5,269,519
[45] Date of Patent: Dec. 14, 1993

[54] GAME SIMULATION INTERFACE APPARATUS AND METHOD

[76] Inventor: David Malone, 11806 Mustang Chase, Austin, Tex. 78727

[21] Appl. No.: 939,432

[22] Filed: Sep. 4, 1992

Related U.S. Application Data

[63] Continuation of Ser. No. 568,195, Aug. 15, 1990, abandoned.

[51] Int. Cl.$^5$ .............................................. A63F 9/22
[52] U.S. Cl. .............................. 273/85 G; 273/148 B; 273/87 R; 273/434; 273/438; 273/DIG. 28
[58] Field of Search ............. 273/85 G, 87 R, 88, 273/29 R, 29 A, 25, 26 R, 148 B, 183.1, 185 R, 185 A, 185 B, 186.1, 186.2, 186.3, 37, 56, DIG. 28, 438, 436, 434, 440, 454, 460; 434/247, 249, 252

[56] References Cited

U.S. PATENT DOCUMENTS

| | | | |
|---|---|---|---|
| 3,531,116 | 9/1970 | Trzesniewski | 273/26 R |
| 4,264,072 | 4/1981 | Chalmers | 273/85 G |
| 4,695,953 | 9/1987 | Blair et al. | 273/85 G |
| 4,767,121 | 8/1988 | Tonner | 273/185 A |
| 4,817,950 | 4/1989 | Goo | 273/148 B |
| 4,858,934 | 8/1989 | Ladick et al. | 273/183 A |
| 4,976,435 | 12/1990 | Shatford et al. | 273/148 B |

FOREIGN PATENT DOCUMENTS

0278150  8/1988  European Pat. Off. ........ 273/183 R

*Primary Examiner*—Jessica J. Harrison
*Attorney, Agent, or Firm*—Shaffer & Culbertson

[57] ABSTRACT

A game simulation interface having a viewing device for viewing a prerecorded video game connected with a video playing device for playing the prerecorded video game to be viewed. An analyzer is used for obtaining data from a user's actual movement of a sports racquet, such as a golf club. The analyzer obtains data from a group of data including club speed, angle at impact, path before impact, position of ball at impact, and carry distance. An interface interconnects the analyzer and the video player so that data obtained from the analyzer is translated into a form acceptable to the video player so that mechanical manipulation of buttons of the standard video player is replaced by data derived from the actual swing motions associated with the game. This enables the user to benefit from visual feedback on his/her shot through the video game and also increases his/her pleasure by providing simulated course conditions, of greatly enhanced realism by means of use of video games, as encountered in a real game, such as golf.

6 Claims, 6 Drawing Sheets

GAME SIMULATION INTERFACE APPARATUS AND METHOD

This application is a continuation of application Ser. No. 07/568,195, filed Aug. 15, 1990, now abandoned.

BACKGROUND OF THE INVENTION

This invention relates to an improved game simulation interface device for integrating golf, or other sports, swing "analyzers" with prerecorded home video games.

Recreational activities consume a large part of Americans' time and energy. This enthusiasm for recreation is evidenced by the large number of patents that have issued in sports training and practice apparatus. Sports requiring the use of sports implements, such as golf clubs, tennis racquets, baseball bats, etc., have drawn considerable interest by inventors. In particular, devices designed to simulate the play of a golf game indoors have been widely developed. An example of such a golf training and practice apparatus is disclosed in Cromarty U.S. Pat. No. 4,304,406 which has a television display and a "mat" with a plurality of sensors for sensing positions of a head of a golf club during the swing at a ball at a given location. The television enables alphanumeric display of other parameters of the swing, and provides on the television display a fixed image of the angle of the face of the club at a time just before the club reaches the ball position location. Further, the device provides information concerning the relative weight on each of the golfer's feet during various positions of the swing. Other patents that have issued, of which the applicant is aware, for devices which provide some feedback by means of a television are: McCollough et al. U.S. Pat. No. 3,408,750; Linn, Jr. U.S. Pat. No. 4,163,941; Tonner U.S. Pat. No. 4,767,121; and Ladick et al. U.S. Pat. No. 4,858,934.

Other devices utilize complex backdrops, screens, grids, meshes and the like in order to provide simulated golf experiences. Lynch et al. U.S. Pat. No. 4,160,942 is typical of these highly complex and expensive devices requiring a wide variety of photo cameras, video projection devices and backstops. Others of the same type are: Muskegon et al. U.S. Pat. No. 3,589,732; Conklin et al. U.S. Pat. No. 3,620,537; Christophers et al. U.S. Pat. No. 3,759,528; Lindquist U.S. Pat. No. 4,177,994; and Armantrout et al. U.S. Pat. No. 4,437,672.

A few other devices attempt to provide graphics, of generally rudimentary form, simulating a golf course and where a ball which has previously been "struck" would land. Miller U.S. Pat. No. 4,283,056 and Chen et al. U.S. Pat. No. 4,429,880 provide such rudimentary visual aids. These visual aids suffer in that they are generally not realistic and are not accompanied by realistic sights and sounds of a golf course. Further, they very often do not incorporate the actual hazards that one would encounter on a typical golf course. As a result they are less instructive than they could be.

On the opposite end of the spectrum, from sports to entertainment, there has been an explosion of video games throughout the country. These video games have moved out of arcades and moved into the home and have become ever more progressively sophisticated and realistic. In particular, golf games video now include every hazard that one might encounter on an actual course and often times, since they can be fabricated by the user in some cases, more hazards than one might normally encounter in real life. The visual and audio effects on these games are increasingly superior and realistic. Industries have sprung up around them such as exemplified by the NINTENDO (TM) home entertainment system which offers, among other things, "Jack Nicklaus, Greatest 18 Holes Of Major Championship Golf (TM)". Golf games for home entertainment systems such as these provide realistic graphics and sound in simulating the actual play of golf, but they do not provide realistic player participation input in playing the game. The current method of playing the game requires pushing buttons on a handheld controller in order to mechanically manipulate the simulated golfer so as to determine the characteristics of the golf shot.

Drawbacks to many of the golf swing sensing "mats" used for the collection of data concerning the golf swing at home are that they have not provided realistic visual simulation of actual conditions encountered on a golf course. Essentially, previous feedback has been limited to numeric information with limited graphics. A substantial drawback to the commercial devices is that the cost for them is generally prohibitively expensive, between $6,500 to $40,000, for a device that provides little useful training information at all. On the other hand, golf games for home entertainment systems, as previously noted, provide realistic graphics and sound but do not provide realistic input in playing. Thus, there is a need in the art for providing an inexpensive game simulation interface which combines the data collected by the mat, with realistic video games so that actual movement of a sports implement, i.e. a golf club or baseball bat etc., will result in the data being translated into a form acceptable to the video player and video game for the incorporation of the enhanced graphics and sound. It, therefore, is an object of this invention to provide an improved game interface apparatus and method for combining actual swing data with prerecorded games with enhanced graphics and sound.

SHORT STATEMENT OF THE INVENTION

Accordingly, the game simulation interface mechanism of the present invention includes a viewing device, such as a television, a personal computer monitor, or the like, for viewing a prerecorded video game. The television is connected with a video player for playing the recorded video game to be viewed. Also required is a of some type. The preferred type is a mat that utilizes sensors to detect key parameters of the golf club head, baseball bat, etc., during the swing. The player action sensor obtains data from a user's actual movement of a sports implement. The final and critical element of the device is an interface that interconnects the player action sensor with the video player so that data obtained from the player action sensor is translated, by the interface, into a form acceptable to the video player so that mechanical manipulation of the video player's swing is replaced by data derived from the actual motions associated with the game being played. As a result, an actual game is simulated through a prerecorded video game. The player action sensor video games can be of any of a wide variety so that a large group of games could be simulated indoors, out of the rain, etc. This group could include golf, baseball, bowling, and croquet, among others. Additionally, the player action sensor would obtain a wide variety of data including but not limited to the sports implement speed, angle at impact, path before impact, position of ball at impact, and the carry distance the ball would travel had it actually been hit.

BRIEF DESCRIPTION OF THE DRAWINGS

Other objects, advantages, and features of the present invention will become more fully apparent from the following detailed description of the preferred embodiment, the appended claims and the accompanying drawings in which:

DETAILED DESCRIPTION OF THE PREFERRED EMBODIMENT

The preferred embodiment of the present invention is illustrated by way of example in FIGS. 1-7. With specific reference to FIGS. 1 and 2, a game simulation interface 10 includes a video viewing device 12, such as a standard television set, a personal computer monitor, or the like. A computer video player device 14, such as produced under the trademark NINTENDO or a personal computer for example, which is of conventional design known in the art and which are commercially available and well known to those of ordinary skill in the art, is connected to video viewing device 12 by means of electronic connection 16, also known in the art. Video playing device 14 is constructed so as to receive and execute, through video viewing device 12, high resolution, realistic videos 18 (not shown) which come in a wide variety of selections as to the type of entertainment to be provided. In particular, videos 18 offers high resolution, realistic audio and visual representations of a plurality of athletic games, such as golf, baseball, and the like. These videos are commercially available and well known to those of ordinary skill in the art and yet are typified by their realistic reproduction of the game to be played.

Figure 1:
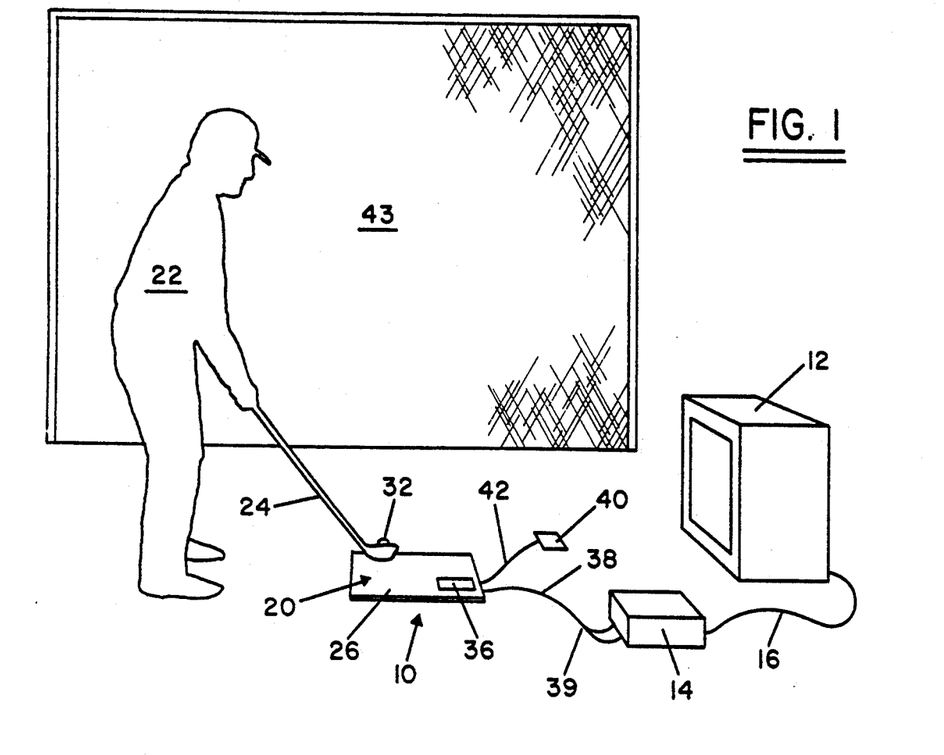
FIG. 1 is a perspective view of a preferred embodiment of the game simulation interface of the present invention showing the device in use by an indoor golfer.
Figure 2:
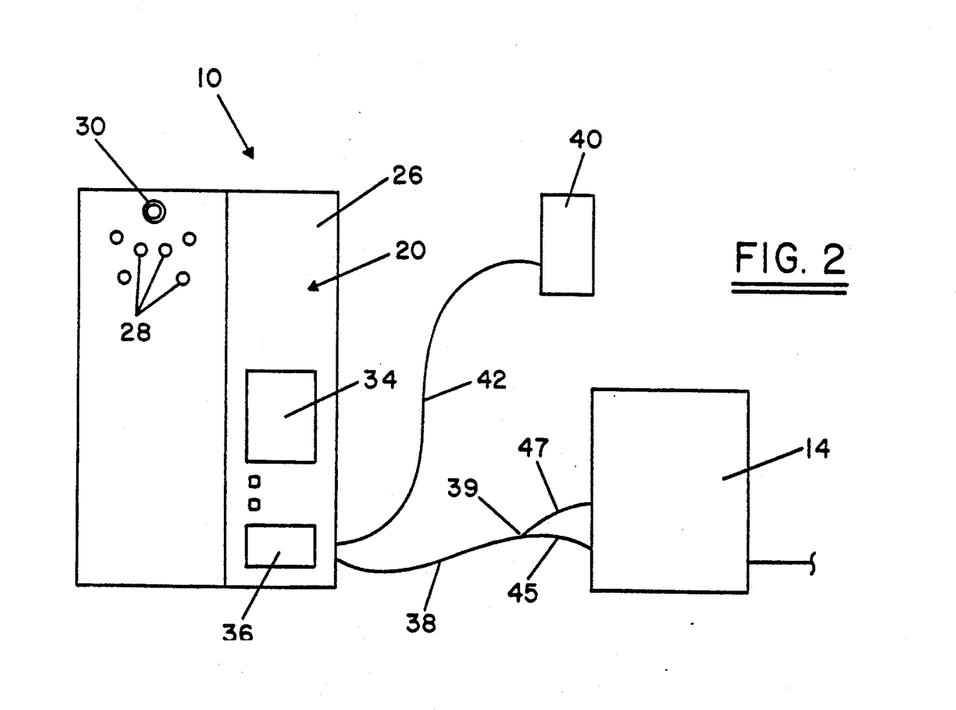
FIG. 2 is a plan view of the analyzer, interface, manual controls, and video player of the invention manual controls, and video player of the invention.

Player action sensor 20 is also commercially available and well known to those of ordinary skill in the art. It is designed to obtain data from user 22 during actual movement of a sports implement, such as golf club 24. As shown in FIGS. 1 and 2 player action sensor 20 is comprised of mat 26, a plurality of club sensors 28, ball support 30 for ball 32, and data display 34. As an example, one such player action sensor, suitable for use in the preferred embodiment of the present invention, is the MIYA SHOT ANALYZER (TM) made by MIYAMAE Co. Ltd. of Japan.

Mounted on the top side of mat 26 is interface 36 discussed more fully hereafter. Interface 36 is connected to player action sensor 20 so that data is obtained from the player action sensor 20 as to the particular parameters of the user's 22 swing of golf club 24. This data is translated, in a manner more fully disclosed hereafter, into a form acceptable to the video 18 being played on video playing device 14 and shown on video viewing device 12. This intercepted and translated data is transmitted to video playing device 14 by means of electrical connection 38. Electrical connection 38 has a "Y" 39 that terminates in video player 1 input 45 and video player 2 input 47.

FIGS. 1 and 2 additionally illustrate manual video controller 40 connected to interface 36 by electrical connection 42 and hence with video playing device 14 so that video 18 may be manipulated, for whatever reason, in the normal "button pushing" manner, known in the art. In particular, manual operator 40 is useful in setting up the video 18 for proper play through selection of club, set up, aiming and any other matters not directly related to the actual swing.

The provision of net 43 enables user 22 to actually hit a ball 32 so that the game may be practiced indoors. Net 43 and ball 32 are not necessary, however, for the utilization of the device since mat 26 obtains data concerning racquet/club speed, angle at impact, path before impact, position of ball at impact, and carry distance, whether or not an actual ball 32 is struck.

Figure 3:
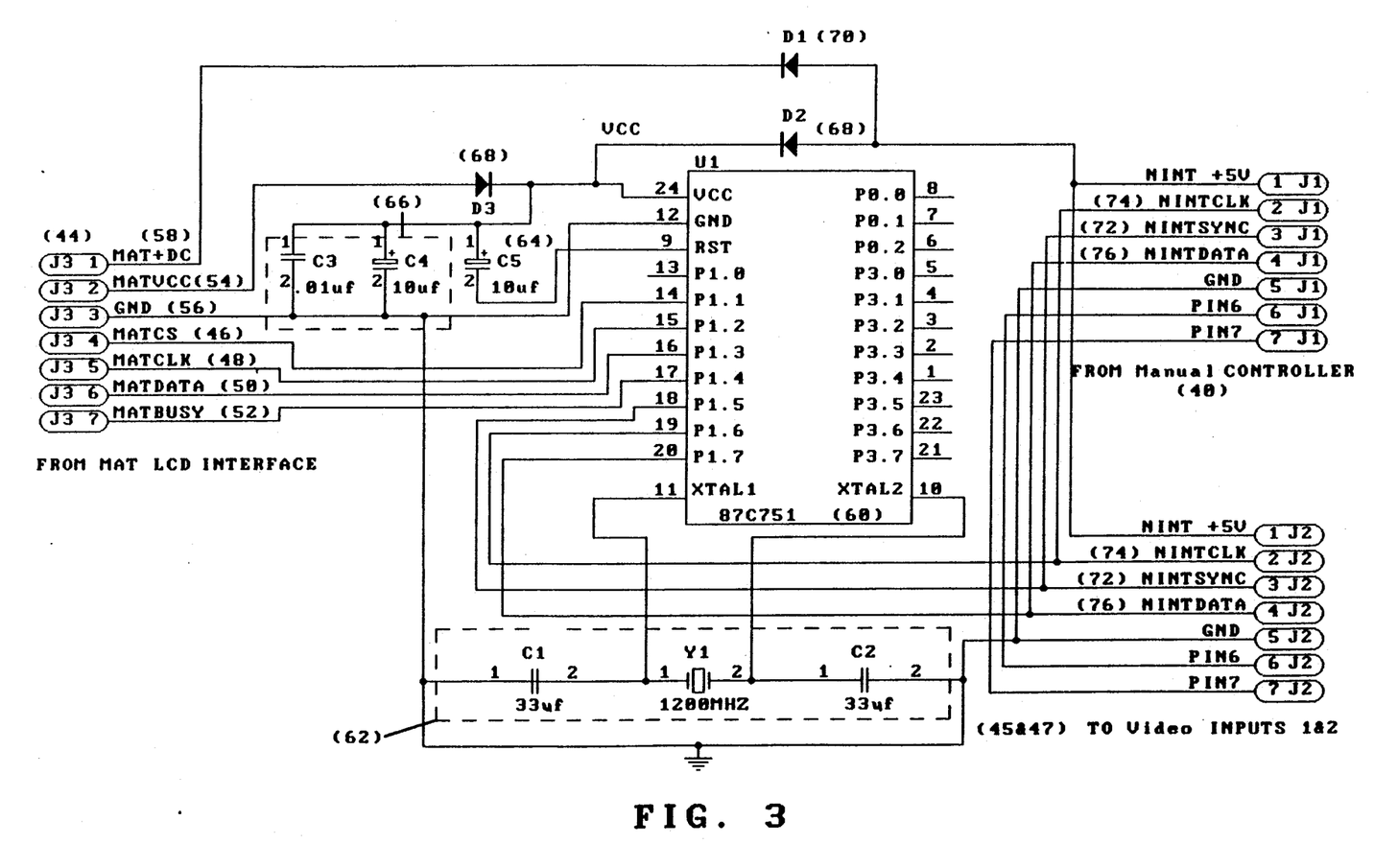
FIG. 3 is a schematic diagram illustrating the connection between the player action sensor and the manual controller and the video player.
Figure 4:
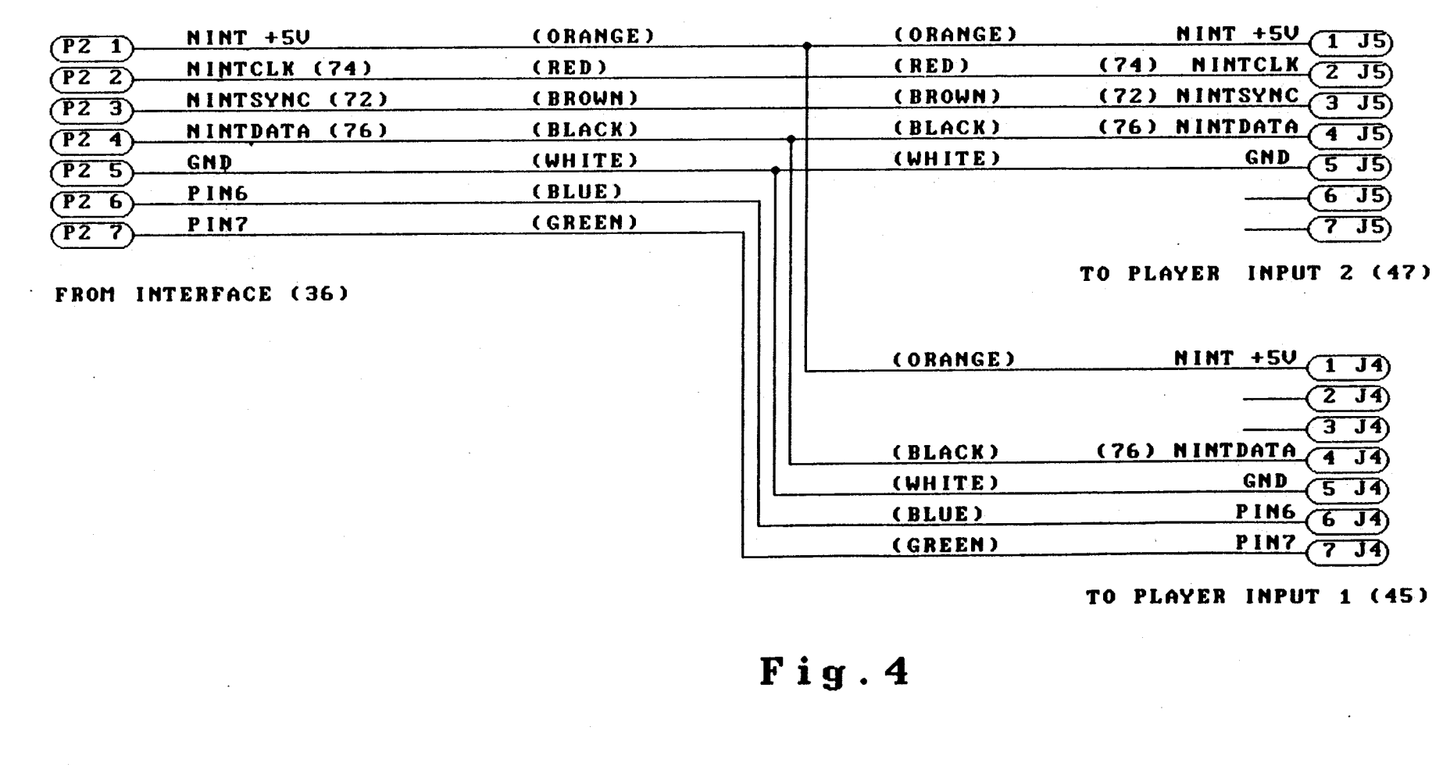
FIG. 4 is a schematic diagram illustrating the connections from the interface to two video player inputs.

Refer now to FIGS. 3 and 4, which are simplified schematic diagrams. FIG. 3 shows that playing action sensor 20 and mat 26 contain a printed circuit board (PCB), known in the art and not described further herein, which contains the circuits for detecting the golf club movement over the mat 26 as well as the driver for data display 34 (such as a liquid crystal display (LCD)) which shows the results from each swing. The ability to select the type of club used is also included. The conversion is accomplished using an 8048 family microcontroller and displayed using a uPD7225 LCD controller, such as built by the NEC Company. It is these signals driving the uPD7225 that are connected to interface 36. This data is sent via a serial interface 44 using a set of four TTL compatible signals as follows: MATCS 46 which enables data transfer; MATCLK 48 indicating data is valid on rising edge; MATDATA 50 positive true data, starting with MSB; and MATBUSY 52 which indicates completed 8-bit byte. These signals, as well as VCC 54, GND 56, and unregulated DC power 58 are connected to interface 36 in a manner known in the art, such as discrete wires that are soldered in place. The unregulated DC power 58 is connected to allow the mat 26 to be powered from the video playing device 14 power source, which eliminates the need for a separate DC-adapter for mat 26.

Interface 36 contains a microcontroller chip 60, such as is commercially available as SIGNETICS 87C751, that converts the swing data from the mat 26 to corresponding button simulations that are input to the video game 18. As previously described, connector J3 connects with mat 26, as shown in FIG. 3, and connectors J1 connects with electrical connection 42 and connector J2 connects with electrical connection 38. Crystal oscillator 62, Y1, C1, and C2, provides a 12 Mhz clock base for microcontroller chip 60. This results in an instruction cycle time of 1 microsecond. Power-on reset 64 is facilitated by C5, while C3 and C4, 66, are used to filter out any unwanted noise on the power line. Diodes 68, D2 and D3, allow microcontroller chip 60 to be powered either by video playing device 14 or mat 26 VCC 54. Diode 70, D1, allows the 26 to be powered by the video playing device 14 when the mat 26 is not connected to an AC adapter. Interface 36 may take the form of a box which, in the preferred embodiment, is attached to mat 26 by means of screws, or any other manner known in the art. Obviously, interface 36 could take other forms and be located elsewhere such as being separate or made part of a circuit board inside player action sensor 20.

Input to the video playing device 14 and video 18 is accomplished by tapping into the signal between standard manual video controller 40 and interface 36. All signals are passed through to allow normal operation while tapping into the control and data signals to allow for remote control by the interface 36. In the standard operation of video playing device 14 with video 18, manual video controller 40 is utilized by means of pushing buttons. Three open collector TTL compatible signals are used to transfer data from controller 40, in the standard manner, in serial format as follows: NINTSYNC 72 which indicates a start of a new byte; NINTCLK 74 in which data is clocked on rising edge; and NINTDATA 76 negative true data corresponding to switches. NINTSYNC 72 is an input that is used to synchronize data output from interface 36. NINTCLK 74, in this embodiment, is ignored and bit timing is assumed to be related to NINTSYNC 72 since the microcontroller is not fast enough to respond to each NINTCLK 74 as an interrupt. Data from interface 36 is wire OR'd to the standard controller 40 data and sent to the video playing device 14. Manual video controller input is simulated by pulling NINTDATA 76 low during the appropriate button scan time to simulate a button being pushed. The output of interface 36 is connected to both manual controller 40 inputs 1 and 2 to allow multiple players. FIG. 4 illustrates the connections from game simulation interface 36 to two video playing device inputs 1, 45, and 2, 47, through "Y" 39.

Figure 5:
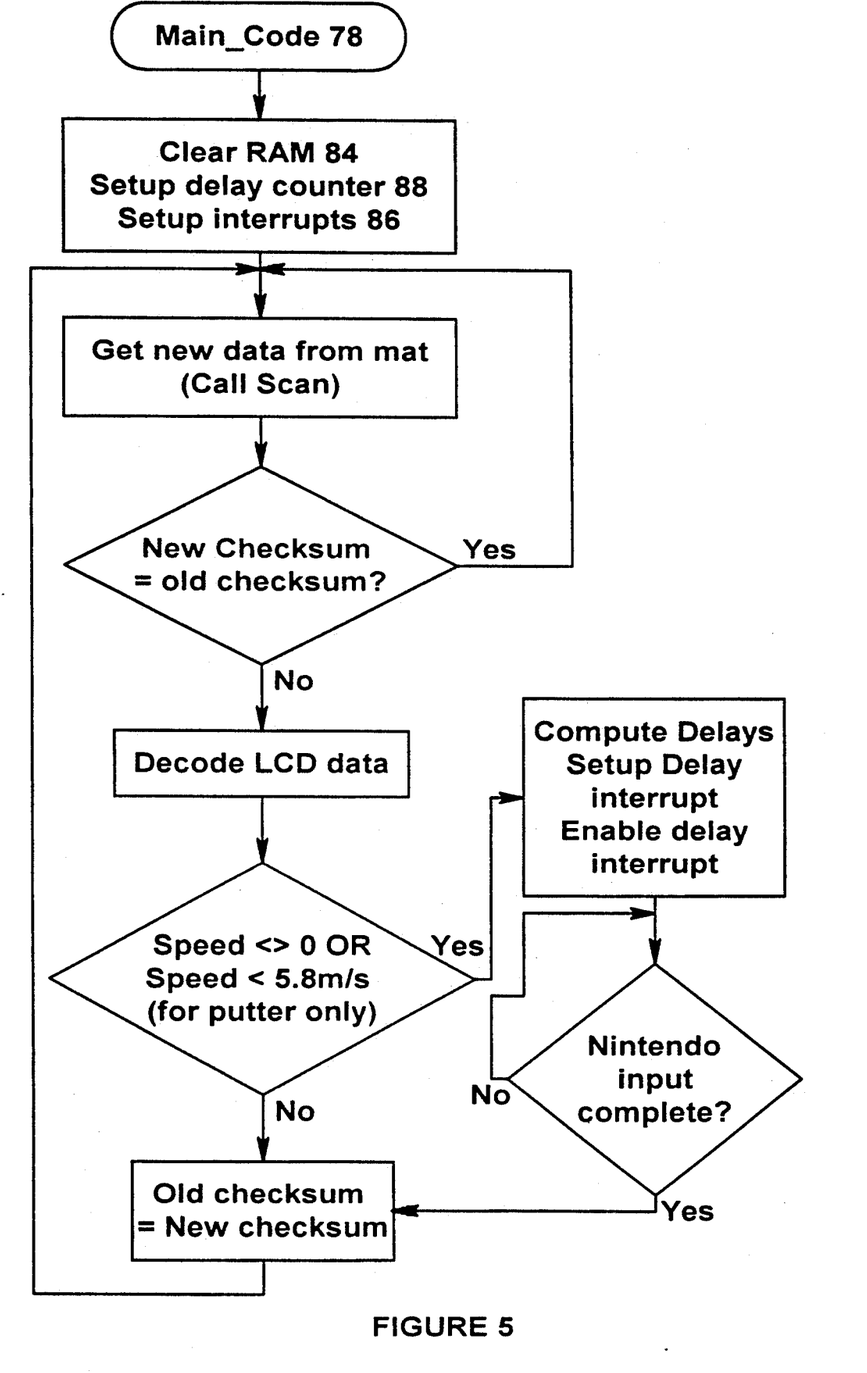
FIG. 5 is flow diagram of the MAIN code module for the interface software of the invention.
Figure 6:
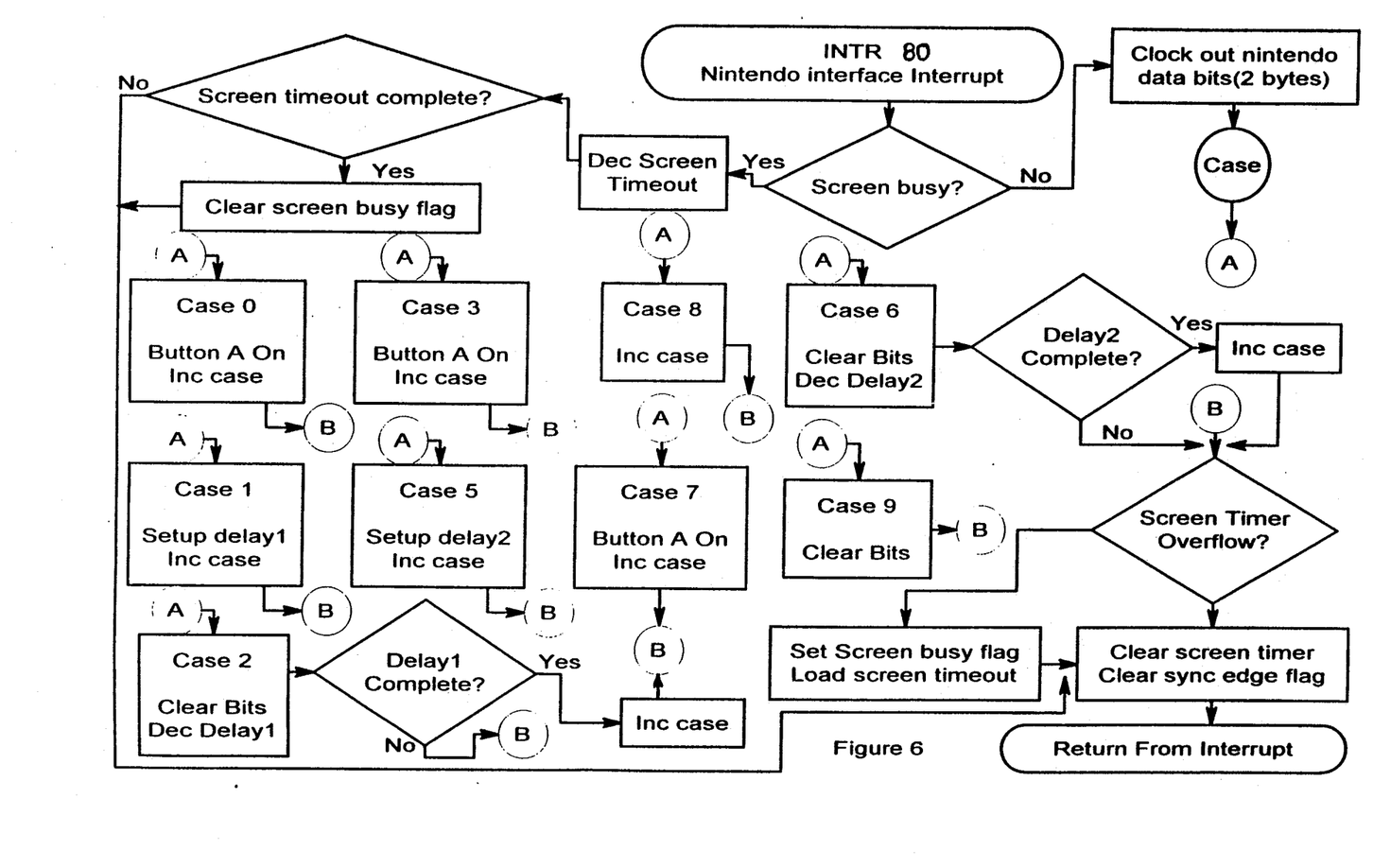
FIG. 6 is flow chart of the INTR interrupt routine of the software of the present invention.
Figure 7:
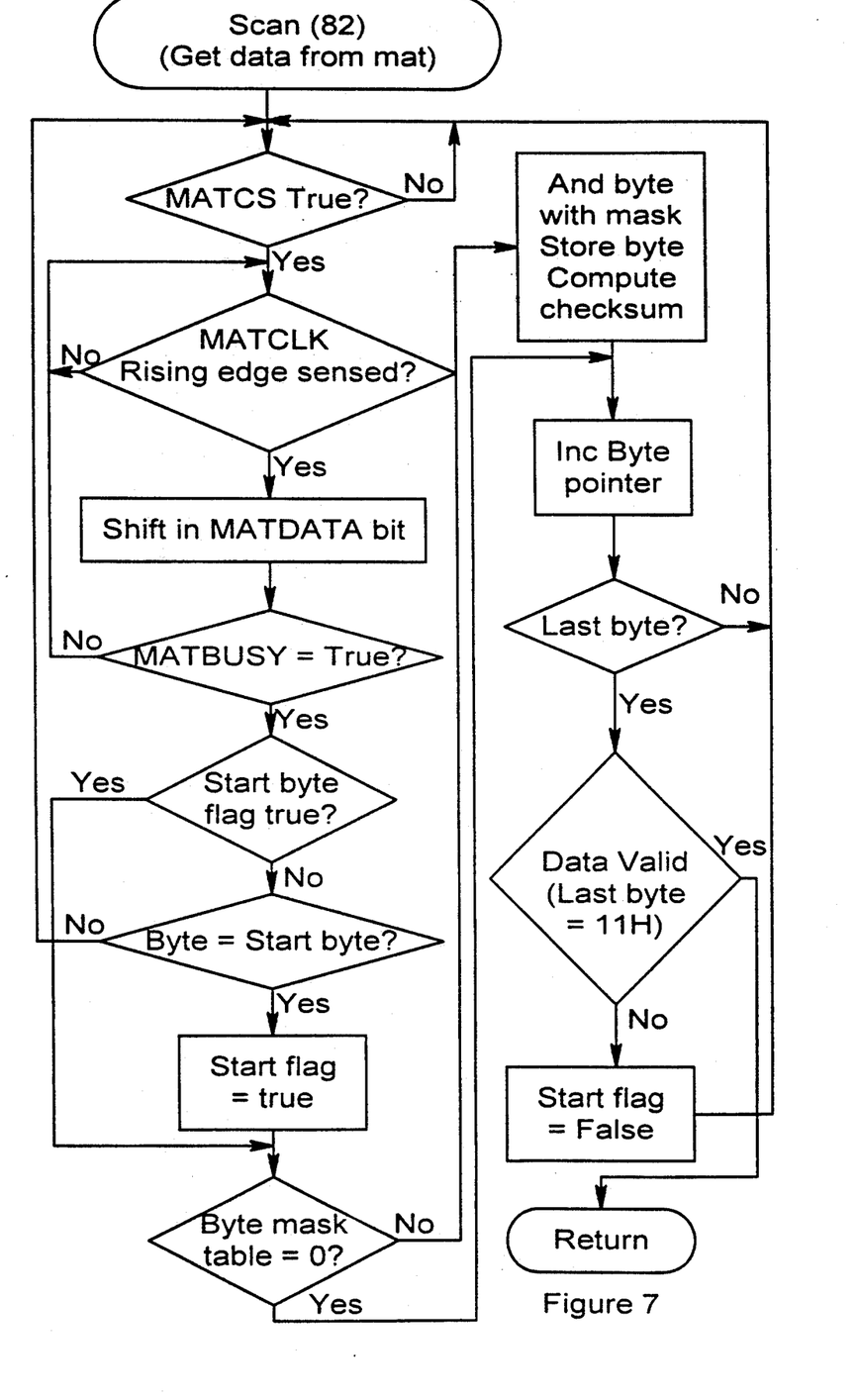
FIG. 7 is a flow diagram of the software for the SCAN module of the present invention that collects the data from the player action sensor and translates it into compatible input for the video player.

Referring now to FIGS. 5, 6, and 7, interface 36 software is shown to be made up of three separate modules. The MAIN code module 78, is written in PLM-51, and contains the startup, main loop and conversion software routines. The INTR module 80 contains the interrupt driven code written in ASM-51 that services the video playing device interface. Finally, the SCAN module 82, written in ASM-51, decodes the data stream going to the display 34 and collects the swing profile data produced by user 22 that is used to compute the input to the video playing device 14 unit.

As shown in FIG. 5, upon power-up, the internal ram data 84 is cleared and the external interrupt 86 is set up as well as the set up delay counter 88 used to detect when the screen is being updated. After initialization, the main loop is entered that scans for new data from mat 26, decodes user's 22 swing data, converts the swing data into times equivalent to a button being pushed as in manual controller 40, and finally sets up the interface 36 interrupt to output the simulated button sequence to the video viewing device 12. Next, a loop is entered to wait until the data sequence output to the video playing device 14 is complete. Another scan for new data from mat 26 is begun and the process is repeated indefinitely. During the scanning for data from mat 26, all interrupts are disabled so that all input signals can be scanned without delay.

Referring to FIG. 6, this interrupt routine only runs when a simulated button sequence is being output to video playing device 14 and is disabled most of the time. When enabled, this routine is entered when a NINTSYNC 72 rising edge is detected. This routine outputs simulated button inputs to the video playing device 14, detects when the screen is being updated, and keeps track of how many scans have been completed. INTR module 80 interrupt is always in one of nine possible states as shown in flow diagram represented by FIG. 6. Which state it is in depends on the case value. This is used to allow the button data to be repeated twice to be sure it is detected by the video playing device 14 and to delay a known amount of scan cycles between button-on scans. The ability to count scans and output button events allow control of the golf swing strength and direction as well as adjustment, by means of manual controller 40, of the aiming point before each shot, as is known in the art for video golf games for example.

Referring now to FIG. 7, SCAN module 82 illustrates how data is obtained from mat 26 once it has been internally transferred in mat 26 to data display 34. As shown in FIG. 7, first the presence of a valid MATCS 46 signal is detected and the data bit present on MATDATA is clocked by MATCLK into a byte until all 8 bits are stored (this is indicated by MATBUSY going low). Each completed byte is checked to see if it is the start of the path display sequence. After the start of the sequence is detected, the byte detection process is repeated for 36 bytes. While gathering data, a continuous check sum is calculated by adding each byte. To add more complexity to the check sum calculation, the accumulated check sum value is rotated left one bit before adding to detect not only different bits but also byte order. Before adding, however, each byte is masked with a corresponding mask table byte to remove bits that may change even when the significant data from mat 26 stays the same. This prevents detection of a false swing. Bytes with a corresponding masked value of zero are discarded. After the bytes are filtered and stored and the check sum is calculated, program execution returns back to the main loop for further processing.

In operation, game simulation interface 10 consists of a video viewing device 12, such as a television, PC monitor, or the like, placed so that user 22 can observe the results of his or her swing. User 22 swings a sports implement of some type, including bats, racquets, etc. FIG. 1 illustrates the preferred embodiment utilizing a golf club 24. By means of backstop 43, consisting of a nylon net or cloth or some sort material known in the art, user 22 can actually hit golf ball 32 without harm while indoors if he or she desires. Again, it should be noted that it is not necessary for user 22 to actually hit golf ball 32 in order for the game simulation interface 10 to function. Next, user 22 selects a video 18, not shown, of his or her choice. In the preferred example the choice would be of a golf game known in the art and typically used with video playing devices 14. The videos in the preferred embodiment of the invention are high resolution games including enhanced graphics and sounds so that an evermore realistic representation of an actual golf course is provided. User 22 inserts video 18 into video playing device 14 which is connected by electrical connection 16 to viewing device 12 in a manner known in the art. Ball 32 is placed on ball support 30 on player action sensor 20. Player action sensor 20, in the preferred embodiment, consists of a more or less flat mat 26. Mat 26 has a plurality of sensors 28, such as photo electric sensors, laser sensors, proximity sensors, etc. Sensors 28 detect the critical elements of user's 22 swing of the sports implement, in this case golf club 24. This data includes, but is not limited to, club speed, angle at impact, path before impact, position of the ball on the face of the club at impact, and carry distance. This is displayed, in a manner known in the art, on data display 34 of mat 26. As previously described, mat interface 36 taps into the mat 26 and retrieves the swing analysis information. This information is then converted into the proper signals to simulate manual input to the video playing device 14 by software programs, previously discussed, running on a microcontroller located on the interface 36 printed circuit board. Using actual swing movement to control the video game, rather than the manual controllers known in the art, provides a more realistic play and feel than using manual video controller 40, although manual controller 40 is maintained for use in aiming, club selection, set up, etc. By means of game simulation interface 10 the user substitutes him or herself for the figure movements on the video game. That is, the results of the user's 22 actual swing are simulated by the golfer on the simulated golf course in video 18 which contains, once again, many of the hazards and obstacles, if not more than, normally encountered in a game of golf. It must be understood that the key club head parameters as measured by mat 26 are converted into the proper sequence and timing of simulated button closures as understood by the video game 18. These simulated closures drive the simulated golfer on the video game 18 to hit a shot which closely resembles the actual golf swing of the user, as measured by mat 26. This gives golfer/user 22 the benefit of visual feedback on his/her shot and also increases his/her pleasure by providing simulated course conditions as encountered in a real golf game.

While the present invention has been disclosed in connection with the preferred embodiment thereof, it should be understood that there may be other embodiments which fall within the spirit and scope of the invention as defined by the following claims.

I claim:

1. A game simulation mechanism, utilizing prerecorded video games and systems wherein the video games are activated by button closures and utilizing an action sensor mat wherein the action sensor mat senses actual game motions, the game simulation mechanism having an interface comprising:

(a) a first connection means connected to the action sensor mat and to a translation and transmission means for receiving data through said first connection means from the action sensor mat representative of actual game motions;

(b) a translation and transmission means for translating the data from the action sensor mat into data representative of button closures acceptable to the video game systems and for transmitting the button closure data to the video game system; and (c) a second connection means connected to the translation and transmission means and to the video game systems for transferring the button closure data to the video game systems so that game motion data is translated into button closure data.

2. The mechanism of claim 1 wherein said prerecorded video game is selected from a group of games including golf, baseball, bowling and croquet.

3. The mechanism of claim 1 wherein said translation and transmission means receives data from a group of data including a sports implement's speed, angle at impact, path before impact, position of a ball at impact, and carry distance.

4. A game simulation method, utilizing prerecorded video games and systems wherein the video games are activated by button closures and utilizing an action sensor mat wherein the action sensor mat senses actual game motions, the game simulation method comprising the steps of:

(a) connecting a first connection means to the action sensor mat and to a translation and transmission means for receiving data through said first connection means from the action sensor mat representative of actual game motions;

(b) providing a translation and transmission means for translating the data from the action sensor mat into data representative of button closures acceptable to the video game systems and for transmitting the button closure data to the video game systems; and (c) connecting a second connection means to the translation and transmission means and to the video game systems for transferring the button closure data to the video game systems so that game motion data is translated into button closure data.

5. The method of claim 4 wherein said prerecorded video game is selected from a group of games including golf, baseball, bowling, and croquet.

6. The method of claim 4 wherein providing said translation and transmission means further comprises the step of receiving data from a group of data including a sports implement's speed, angle at impact, path before impact, position of a ball at impact, and carry distance.

* * * * *